United States Patent [19]

Litka et al.

[11] Patent Number: 5,672,190
[45] Date of Patent: *Sep. 30, 1997

[54] POOL SEPARATION MELT FURNACE AND PROCESS

[75] Inventors: Anthony F. Litka, Hanover; Jamie A. Woodroffe, North Reading; Victor Goldfarb, Swampscott; Andrew W. McClaine, Lexington; Kevin J. Keane, Brookline, all of Mass.

[73] Assignee: Gas Research Institute, Chicago, Ill.

[*] Notice: The term of this patent shall not extend beyond the expiration date of Pat. No. 5,447,547.

[21] Appl. No.: 494,500

[22] Filed: Jun. 26, 1995

Related U.S. Application Data

[63] Continuation of Ser. No. 189,197, Jan. 31, 1994, abandoned.

[51] Int. Cl.⁶ ............................ C03B 5/16; C03B 3/00; C03B 5/00
[52] U.S. Cl. ............ 65/134.1; 65/134.4; 65/135.2; 65/135.9; 65/335; 65/347
[58] Field of Search ................. 65/134.1, 134.4, 65/135.2, 135.9, 136.1, 335, 347, 27

[56] References Cited

U.S. PATENT DOCUMENTS

| | | | |
|---|---|---|---|
| 1,500,651 | 7/1924 | Smith . | |
| 2,455,907 | 12/1948 | Slayter | 65/335 |
| 2,577,920 | 12/1951 | Russell et al. | 259/19 |
| 3,163,520 | 12/1964 | Collin et al. | 75/10 |
| 3,245,769 | 4/1966 | Eck et al. | 65/27 |
| 3,331,673 | 7/1967 | Bour | 65/130 |
| 3,443,921 | 5/1969 | Boivent | 65/134 |
| 3,466,160 | 9/1969 | Keefer | 65/157 |
| 3,489,547 | 1/1970 | Plumat | 65/347 |
| 3,563,722 | 2/1971 | Troyankin et al. | 65/335 |
| 3,592,623 | 7/1971 | Shepherd | 65/135 |
| 3,741,742 | 6/1973 | Jennings | 65/135 |
| 3,887,326 | 6/1975 | Townley | 432/14 |
| 4,135,904 | 1/1979 | Suzuki et al. | 65/27 |
| 4,290,797 | 9/1981 | Rossi | 65/335 |
| 4,617,042 | 10/1986 | Stickler | 65/27 |
| 4,617,046 | 10/1986 | Hals | 65/134 |
| 4,631,080 | 12/1986 | Westra et al. | 65/134 |
| 4,747,773 | 5/1988 | Predescu et al. | 432/14 |
| 4,816,056 | 3/1989 | Tsai et al. | 65/135 |
| 4,877,449 | 10/1989 | Khinkis | 75/20 R |
| 4,886,448 | 12/1989 | Schurmann et al. | 432/99 |
| 5,044,942 | 9/1991 | Chatwani et al. | 432/9 |
| 5,118,288 | 6/1992 | Litka et al. | 432/96 |
| 5,236,484 | 8/1993 | McNeill | 65/27 |
| 5,243,621 | 9/1993 | McNeill | 65/27 |
| 5,447,547 | 9/1995 | Goldfarb et al. | 65/134.1 |

FOREIGN PATENT DOCUMENTS

| | | |
|---|---|---|
| 0 071 110 A2 | 2/1983 | European Pat. Off. . |
| 1024595 | 4/1964 | United Kingdom . |
| WO90/13522 | 11/1990 | WIPO . |

*Primary Examiner*—Steven P. Griffin
*Attorney, Agent, or Firm*—McAndrews, Held & Malloy, Ltd.

[57] ABSTRACT

Process and furnace for the continuous production of a molten pool from particulate meltable batch materials such as glass-forming raw materials. The raw materials, in particulate form, are injected into and suspended in combustion gases within a combustor section to form a particle-laden gas flow. The gas flow is accelerated vertically downwardly into a refractory chamber to impact the surface of a molten pool, producing inertial separation of the molten particles into the pool and strong shear forces by the exiting combustion gases, resulting in pool circulation and improved fining and homogeneity.

14 Claims, 2 Drawing Sheets

POOL SEPARATION MELT FURNACE AND PROCESS

CROSS REFERENCE TO RELATED APPLICATIONS

The present application is a continuation of U.S. Ser. No. 08/189,197, filed Jan. 31, 1994, entitled "POOL SEPARATION MELT FURNACE AND PROCESS", which is now abandoned.

BACKGROUND OF THE INVENTION

1. Field of the Invention

The present invention relates to an improved melting furnace and process for the heating of particulate batch materials to their melting temperature while they are suspended in a combustion gas flow within a combustor, and for the continuous discharge of the combustion gases and the heated composition into a separation compartment to produce gas separation and high quality, homogeneous molten compositions. The invention is mainly concerned with the production of glass compositions but is applicable to any process in which particulate batch materials are being heated while suspended in a combustion gas, and gaseous materials are being separated therefrom, such as calcining processes in which water vapor and carbon dioxide are released, melting ground glass cullet, vitrifying minerals, melting fiberglass scrap, etc.

2. Discussion of Prior Art

A wide variety of glass making furnaces are known for the production of molten glass from glass forming batch materials which are fed into a molten pool while heat is applied to maintain a satisfactory temperature, such as about 1400° C.

It is known to preheat and/or melt glass-forming batch materials before their introduction to a molten pool, and reference is made to U.S. Pat. Nos. 3,443,921; 3,741,742; 4,135,904 and 4,816,056 for their disclosures of glass-making furnaces incorporating premelting or preheating means.

It is also known to heat the molten glass in a glass-making furnace by means of combustion gas jets directed from above the molten glass pool and/or to impart circulation to the molten pool and greater uniformity or homogeneity to the final glass. Reference is made to U.S. Pat. Nos. 3,489,547; 3,563,722 and 3,592,623 as well as 4,816,056 referred to above.

It is also known to introduce glass-forming batch materials to the glass-making furnace by feeding them into combustion gas burners for tangential discharge from the burner nozzles into an upper cyclone chamber of the furnace in which they are swirled and rendered molten before passing as a melt into the molten glass pool at the base of the furnace. Reference is again made to U.S. Pat. No. 3,563,722.

Such prior known glass-making furnaces are not as efficient as possible with respect to heat transfer, particle/gas separation and molten pool circulation and uniformity. Improvements in pool circulation result in more complete fining or gas bubble separation and greater uniformity of the molten composition and homogeneity of the formed glass.

Commonly-owned U.S. Pat. Nos. 4,617,042; 4,617,046 and 4,631,080 disclose methods of and apparatus for heat processing particulate material wherein finely pulverized glass batch material is heated very rapidly by preheating and mixing glass batch material in suspension in preheated oxidizer and/or fuel flow in an injector assembly, heating the glass batch material to a high temperature in the burner assembly, directing the products of combustion and high temperature batch material suspended therein through an accelerating nozzle, to form a downwardly directed linear flow having a small cross-sectional area, and causing the accelerated flow exiting from the nozzle to impact on a solid impact surface above the molten pool, the high temperature batch material adhering to this impact surface and then flowing down its sides to the molten pool.

In accordance with the aforementioned Patents, glass batch material is heated in suspension in the products of combustion to a condition at which it can form a flowing layer on the solid interposed impact surface and rapidly react to form glass product. The impact body provides the multiple function of separation of the glass batch material from the products of combustion, fining and at least substantial reaction of the constituents of the glass batch material.

In addition to efficient heat transfer, highly effective glass fining is provided by a thin flowing melt layer having strong internal shear motion. Thus, prior art fining agents, such as sulfates, are not required, which eliminates a source of $SO_x$ pollutant emission. The inventions of the Patents also allow accurate control of combustion stoichiometry, so that carbon addition to the batch, as would normally be required for reduced flint glass production, is not necessary.

The disadvantages of the methods and apparatuses of the U.S. Pat. Nos. 4,617,042, 4,617,046 and 4,631,080 pertain mainly to the interposed solid impact surface which presents a maintenance problem due to abrasion and corrosion from the batch flow over the surface. In addition, unless the batch particles are very fine, the melted batch materials splatter against the walls of the melt compartment which can cause corrosion of the walls of the melt compartment.

Therefore, it is desirable to provide a method and apparatus for the melting of relatively large batch particles, as well as fine batch particles, while producing separation of gaseous products without interposing any solid impact surface between the molten particles and the molten bath.

SUMMARY OF THE INVENTION

The present invention relates to a novel heating process, such as a glass-making or a calcination process, and to a novel furnace for carrying out said process, wherein solid particulate batch materials are injected and expanded into a high intensity gas-fired combustor section where they are suspended in hot combustion gases for a sufficient duration to heat them to a desired temperature, such as a melting temperature, and the heated particles are accelerated downwardly through a combustor nozzle from the combustion chamber into a lower refractory separation chamber as a particle-laden combustion gas flow to impact against the surface of a molten pool of the batch material at the base of the refractory chamber. Some of the suspended particles of the batch material, including the flux material, become molten in the combustion chamber, before entry into the molten pool, and the melted and solid particles impart particulate mass and inertia to the gas flow, which causes the formation of a depression in the surface of the molten bath in the area impacted by the gas flow. The impact between the particle-laden gas flow and the molten bath produces an inertial separation between the preheated particles, such as molten and solid glass-forming particles, and the combusted gases of the gas flow, as the particles impress and pierce the surface of the molten composition and become dissolved therein while the gases are continuously repelled by the molten pool in the area of the surface depression therein.

Strong shear forces are continuously created by the exiting of the gases from the depressed area of the molten pool, and these shear forces produce strong circulations within the molten bath which result in uniformity of composition and improved fining or release of gaseous bubbles from the molten bath, and, in the case of glass-forming batch materials, ultimately result in the production of glass having superior uniformity or homogeneity and freedom from gaseous inclusions or bubbles. The separated combusted gases and gaseous by-products and/or reaction products are continuously withdrawn from the refractory chamber air space and preferably are discharged to a heat-recovery system.

The present process and apparatus are applicable to the use of batch material particles which are either finely divided, requiring a high velocity jet to produce separation on impact, or which are sufficiently large to separate on impact when propelled at low velocity or by gravity.

THE DRAWING

FIG. 1 is a schematic illustration of an air-gas radial feed pool separation furnace according to an embodiment of the present invention, and FIG. 2 is a schematic illustration of an oxy-gas, annular feed pool-separation furnace according to another embodiment of the present invention.

DETAILED DESCRIPTION

Figure 1:
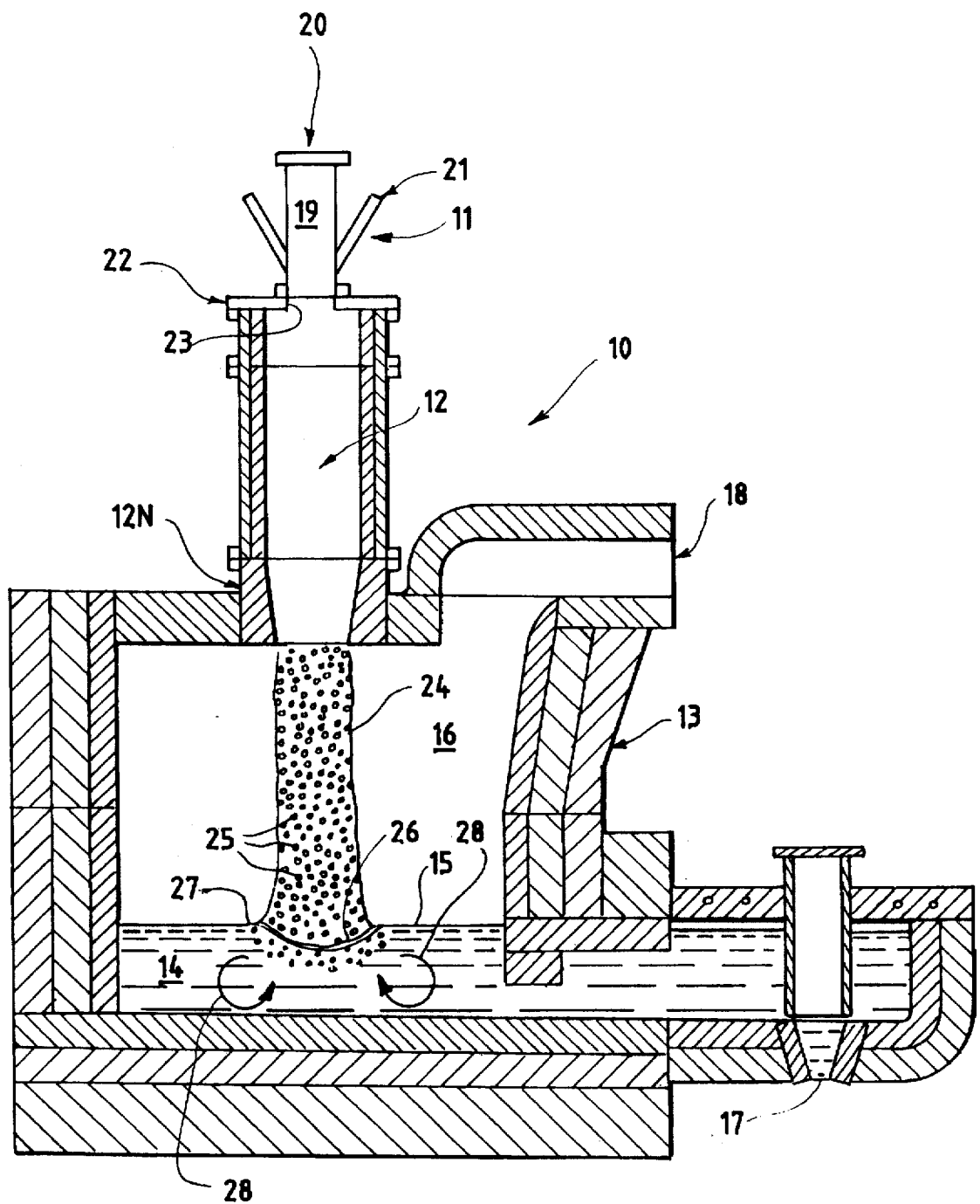

Referring to FIG. 1 of the present drawing, the gas-fired, vertical shaft furnace 10 thereof comprises an upper injector section 11 opening downwardly into an enlarged combustor section 12 which discharges vertically downwardly through a nozzle 12N into a melt chamber 13 having a lower pool section 14, designed to contain a pool 15 of molten composition, and having an upper airspace section 16 designed to receive the separated combustion and/or reaction gases. The reservoir or pool section 14 of the refractory melt chamber 13 is provided with a discharge port 17 through which the molten composition is withdrawn from the pool 15 for transport to a processing station. The airspace section 16 of the refractory chamber 13 is provided with an exit vent 18 for the continuous exhaust of hot combustion gases, gaseous by-products and/or reaction products, preferably to a heat-recovery system.

The upper injector section 11 comprises a mixing chamber 19 having an upstream inlet 20 for admitting a flow of preheated combustion-supporting air at the desired flow rate, a plurality of spaced batch-feeding conduits 21 for introducing a continuous supply of particles of batch material such as glass-forming composition or calcination minerals radially downwardly into the preheated air flow in chamber 19, radial fuel supply conduits 22 having outlets for introducing and burning a combustible gas in a combustion zone into which the particle-laden air flow is directed from within the mixing chamber 19, and a burner 23 at the combustion zone for burning and expanding the burning air/fuel/particle mixture downwardly into the larger combustion chamber 12.

The ignited air/fuel/particle flow heats the suspended particles to near-molten temperatures in the combustion chamber 12 and accelerates them as a jet flow of the desired intensity as it exits the conical, converging lower nozzle 12N of the combustion chamber 12 into the refractory chamber 13, through the airspace section 16, and directly against the surface of the pool 15 of molten composition in the reservoir or pool section 14.

As illustrated schematically by the drawing, the particle-laden combustion gas jet flow 24, containing molten and near-molten solid particles 25, flows through the airspace section 16 of the refractory chamber 13 and impacts the surface of the molten pool 15 with sufficient intensity that it displaces the surface of the pool and forms a well area 26 in the impacted area. The inertia of the particles 25 in the flow causes a substantial portion thereof to continue their downward motion, after impact with the pool surface, and enter the molten composition in the well area 26, and become part thereof. As a result, the gaseous portion of the jet flow 24 is stripped of its particle content and repelled by the molten pool in the well area 26. The repelled combustion gases and gaseous by-products resurface quickly, as gas flow 27, producing strong shear forces which create strong circulation forces 28 within the molten pool, as illustrated schematically by the drawing. These circulation forces cause the newly-integrated, particles 25 to be dispersed and dissolved throughout the molten pool 15. Moreover, the continuous circulation of the molten pool causes all portions thereof to move towards or to the surface of the pool 15 where escape of any trapped gases, or fining, is facilitated.

The inertially-separated hot gas flow 27 is continuously released into the airspace 16 of the refractory chamber 13 and is withdrawn through gas exit vent 18. Preferably the hot gas flow is circulated to a heat exchanger wherein the extracted heat is used to preheat the combustion air introduced to the injector section 11 through inlet 20.

The particulate raw materials which can be used in the present process and apparatus are conventional materials which differ in composition depending upon the exact type of melt being produced. The only critical requirement is that the raw materials must be in particulate form, with relatively uniform particle sizes to promote uniform rapid heat-up, to control the final temperature of the individual components, and to minimize vaporization.

The feed rate for the particulate batch materials introduced through inlet conduits 21 may be varied widely depending upon particle size and the flow rate of the preheated air into the combustor inlet 20.

Batch materials having smaller particle sizes require higher nozzle flow velocities in order to produce the necessary impact and separation force against the molten pool. Larger batch particles produce the desired results at lower nozzle flow velocities.

The force of the accelerated particle-laden gas flow 24 from the combustor nozzle and the distance between the nozzle and the surface of the molten pool 15 in the reservoir or pool section 14 must be such that the well area 26 is formed by inertia during operation.

Figure 2:
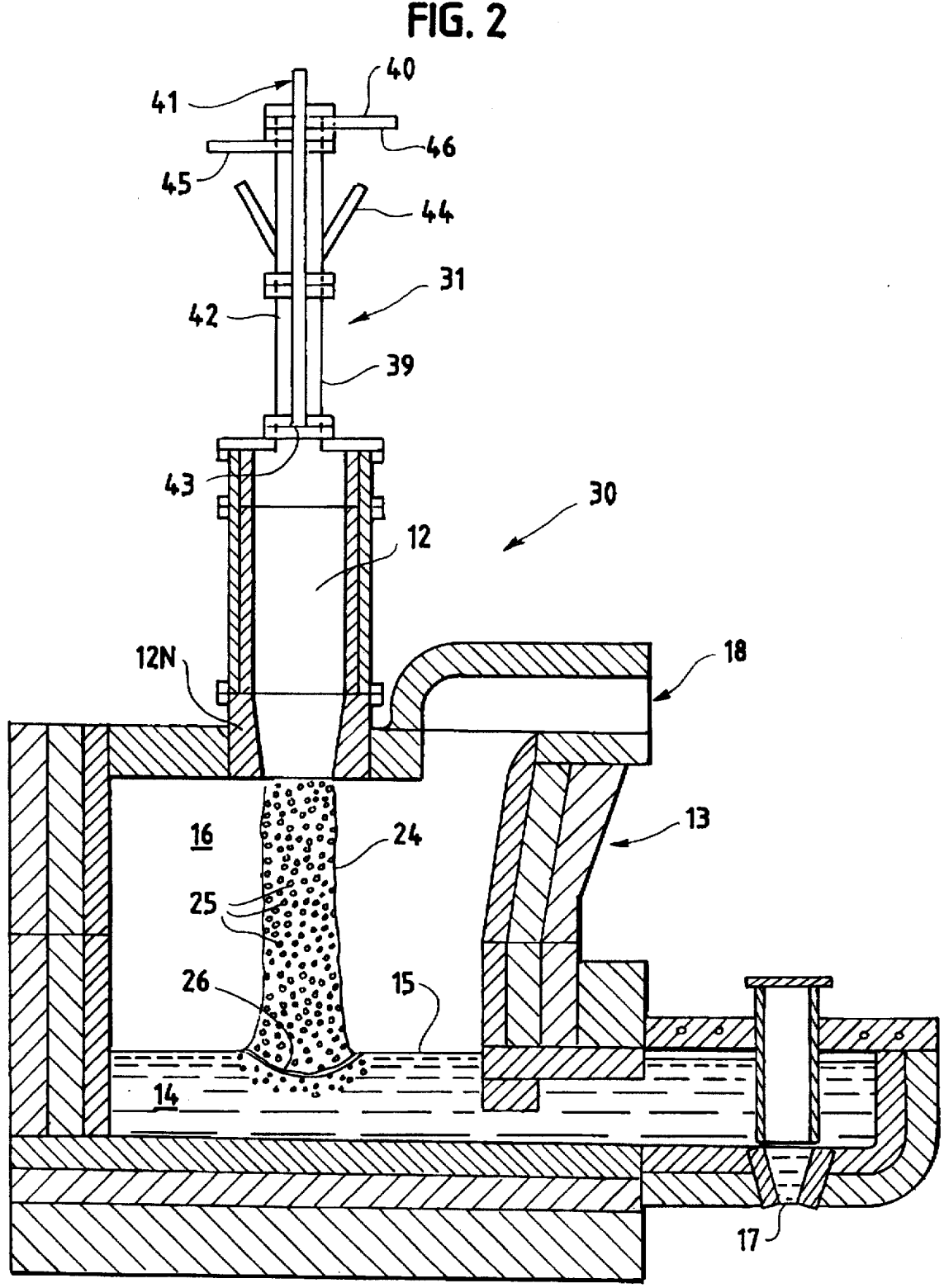

Referring to the embodiment of FIG. 2 of the present drawings, the oxy-gas fired, vertical shaft furnace 30 thereof comprises an upper injector section 31 opening downwardly through a combustion zone into an enlarged combustor section 32 which discharges vertically downwardly through a converging nozzle 32N into a separation chamber 33 having a lower pool section 34, designed to contain a pool 35 of molten composition, and having an upper airspace section 36 designed to receive the separated combustion and/or reaction gases. The reservoir or pool section 34 of the refractory separation chamber 33 is provided with a discharge port 37 through which the molten composition is withdrawn from the pool 35 for transport to a processing station. The airspace section 36 of the refractory chamber 33 is provided with an exit vent 38 for the continuous exhaust of hot combustion gases, gaseous by-products, and/or reaction products, preferably to a heat-recovery system.

The injector section 31 comprises a cylindrical housing 39 having a cap 40 provided with a central bore through which a torch pipe 41 extends the entire length of the injector section 31 to open into a combustion zone at the ceiling area of the combustor section 32 for supplying a fuel such mixture of a gaseous fuel, such as natural gas or propane, and a combustion supporting gas, such as oxygen, to the burner nozzle 43. The injector section 31 also includes an annular passage or mixing chamber 42 within the housing 39 and surrounding the central torch pipe 41. Chamber 42 is sealed at the top by the cap 40 and is open at the bottom adjacent the outlet or nozzle 43 of the torch pipe 41, to the combustion zone at the inlet to the combustor section 32. A plurality of spaced radial or tangential peripheral batch feed conduits 44 open downwardly at an angle of up to 75°, preferably about 30°, into an intermediate area of the annular mixing chamber 42 to permit the drop-feeding or pneumatic feeding of solid particulate batch materials into the mixing chamber 42. Upstream of said conduits 44 are oxygen supply pipes 45 and optional pressurized air supply pipes 46 for feeding a continuous supply of oxygen and, if desired, temperature-moderating air into the annular chamber 42 to provide a gaseous oxygenated flow vehicle for the batch particles introduced at conduits 44 and to supply necessary oxygen and dispersed particles of batch material uniformly around the torch nozzle 41 directly into the combustion flame at the combustion zone. The flame at nozzle 43 diffuses radially-outwardly in all oxygen supplied through the annular passage 42 and to expand the combustion gases into the larger area of the combustion chamber 32. The meltable particles suspended in the combustion gases rapidly absorb heat therefrom during melting and thereby quench the temperature of the combustion gases and significantly reduce the formation of $NO_x$ compounds, which are pollutants.

The duration of suspension of the batch particles in the hot combustion gases is extended by the diffusion and uniform dispersion of the particle suspension throughout the area of the combustion chamber 32, which assures that the flux particles of the batch are essentially melted when the suspension is accelerated through the lower nozzle 32N into the separation section 33 where the molten and solid particles are separated from the hot combustion and/or reaction gases and deposit in the molten pool section 34 while the gases are withdrawn through an overhead exhaust conduit 38, preferably to a heat-recovery system. The absorption of heat from the combustion gases by the batch materials reduces the production of $NO_x$ compounds. The molten pool can be withdrawn from pool section 34, as needed, through drain 37, for any further appropriate processing, such as for the manufacture of glass items, or for use as purified materials such as calcined minerals.

The separation of the molten and near-molten particles and the hot combustion gases occurs on impact of the particle suspension flow with the surface 35 of the molten pool, whereby the particles enter the pool and the hot combustion gases are repelled.

The force of the accelerated particle-laden gas flow 47 containing the heated particles 48 from the combustor nozzle and the distance between the orifice of the nozzle 32N and the surface 35 of the molten pool in the reservoir or pool section 34 must be such that the well area 49 is formed during operation. The particulate raw materials which can be used in the present process and apparatus are conventional materials which differ in composition depending upon the exact type of melt being produced. The only critical requirement is that the raw materials must be in particulate form, with particles being sized to promote rapid heat-up, to control the final temperature of the individual components and to minimize vaporization.

The feed rate for the particulate batch materials introduced through inlet conduits 21 of FIG. 1 and 44 of FIG. 2 may be varied widely depending upon the flow rate of the preheated air and/or oxygen into the combustor inlet.

Batch materials having smaller particle sizes require higher nozzle flow velocities in order to produce the necessary impact and separation force against the molten pool. Larger batch particles produce the desired results at lower nozzle flow velocities.

According to a preferred embodiment, the fuel nozzle 43 of FIG. 2 supplies a fuel-rich mixture comprising all the fuel, such as natural gas or propane and some of the oxygen required for the combustion process. The fuel-rich mixture can range from near-stoichiometric to a fuel rich stoichiometry greater than about four. At a fuel-rich stoichiometry of about four the flame temperature at the nozzle 43 is only about equal to the melting temperature of some of the volatile materials present in the batch mixture. Therefore volatization or evaporation of the volatiles in the region of the nozzle 43, which is poorly quenched by particles, is minimized. Fuel mixes with the mixture of particles and combustion supporting gas which flows into the combustion zone area surrounding the nozzle, burns and heats the particles which quenches the flame temperature. This provides substantially-complete combustion of the fuel gases within the combustor to maximize the heating of the particles and to reduce the formation of $NO_x$ compounds. Adjustment of the fuel supply and the volume of oxygen supplied with the batch materials enables the provision of oxygen/fuel mixtures having predetermined selected stoichiometric variations, depending upon whether a reducing or an oxidizing atmosphere is desired.

For glass melting processes, the combustor 12 preferably is lined with a glass-compatible refractory liner applied over a refractory insulation. The purpose of the insulation and liner is to maintain the wall temperature high enough to prevent devitrification of the melting glass materials but low enough to prevent significant flow of the molten glass over the wall. By maintaining the wall at a moderate temperature, the molten glass can be used as a protective layer for the refractory liner to increase the lifetime of the liner.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A furnace for the suspension and heating of particles of a batch material to its melting temperature in a hot combustion gas and for the separation of the heated particles from said combustion gas, comprising an upper injector section which opens downwardly through a combustion zone into a larger combustor section which opens downwardly to a lower refractory section having a reservoir area for containing a molten pool of the batch material, said upper injector section comprising a mixing chamber having inlet means for the introduction of a continuous supply of a combustion-supporting gas, and having batch inlet means for the introduction of a continuous supply of particles of batch material to form a uniform mixture with said combustion-supporting gas in said mixing chamber, and a fuel conduit having outlet means adjacent the entrance to said combustor section for supplying and burning a fuel in the presence of said combustion-supporting gas in said combustion zone to form and expand into said combustor section a suspension of said particles in hot combustion gas; means for directing said suspension vertically-downwardly through said combustor section as a particle-laden gas flow in which said particles become heated to their melting temperature; and means for accelerating the heated particle-laden gas flow into said lower refractory section with a sufficient force to form a depressed well area in the surface of a molten pool of the batch material deposited in the reservoir area of said refractory section, whereby the heated particles of batch material are inertially-separated from the combustion gas in said particle-laden gas flow and are dissolved into said molten pool while the combustion gas is repelled and exits the well area with shear forces which cause circulation in said molten pool, and vent means for removing the separated combustion gas from said refractory section.

2. A furnace according to claim 1 in which said mixing chamber comprises an annular mixing chamber surrounding a central coaxial fuel conduit comprising said fuel conduit outlet means, said mixing chamber and said fuel conduit opening to each other at the entrance of said combustor section.

3. A furnace according to claim 2 in which said annular mixing chamber comprises said batch inlet means introducing said batch material radially downwardly into said annular mixing chamber, and further comprises an upstream inlet means for introducing combustion-supporting gas comprising air and/or oxygen into said annular mixing chamber to suspend and heat said particles of batch material in said mixing chamber and propel said particles of batch material into said combustion zone.

4. A furnace according to claim 1 in which said means for accelerating said heated particle-laden gas flow comprises a converging nozzle.

5. A continuous process for suspending and heating particulate batch materials in hot combustion gases and for separating the heated particulate materials from the combustion gases, the process comprising the steps of:

A. continuously supplying combustion-supporting gas and meltable particulate batch materials to a combustion zone at the entrance of a combustion chamber;

B. continuously supplying fuel to the combustion zone;

C. burning the fuel and combustion-supporting gas to form and expand into the combustion chamber a hot combustion gas that suspends the particulate batch materials and heats the particulate batch materials to their melting temperature; and D. accelerating the heated particulate batch materials and hot combustion gas vertically downwardly through a restricted orifice into a reservoir chamber and into contact with the surface of a molten pool of said batch materials in the reservoir chamber, said accelerating step being performed with sufficient force to integrate and dissolve the particulate batch materials into the molten pool while repelling and separating the combustion gas to produce circulation of the molten pool.

6. The continuous process of claim 5 wherein (i) the combustion-supporting gas is preheated prior to entering into the combustion zone in step A, (ii) the particulate batch material in step A consists of solid particles, and (iii) the combustion gas and particulate batch materials impact the surface of the molten pool in step D to form a depression in the surface and cause the particulate batch materials to separate from the combustion gas and penetrate the molten pool.

7. The continuous process of claim 6, wherein the impact on the surface by the molten pool of the combustion gas and particulate batch materials causes (a) a portion of said combustion gas to be repelled from the depression and (b) circulations in the molten pool which enhance uniformity of a melt composition and the release of gas bubbles therefrom.

8. The continuous process of claim 5 wherein (i) the combustion-supporting gas is preheated prior to entering into the combustion zone in step A, and (ii) during the continuous supplying step A, the particulate batch materials are fed radially downwardly into the combustion zone.

9. The continuous process of claim 5 wherein the restricted orifice includes a converging nozzle.

10. The process of claim 5 wherein the particulate batch materials comprise glass forming particles.

11. A process for suspending and heating particulate batch materials in hot combustion gases and for separating the heated particulate materials from the combustion gases, the process comprising the steps of:

A. supplying meltable particulate batch materials into an annular mixing chamber surrounding and coaxial with a fuel conduit;

B. introducing a flow of combustion-supporting gas into the annular mixing chamber to suspend the particulate batch materials in the combustion-supporting gas;

C. feeding the mixture of combustion-supporting gas and suspended particulate batch materials from the annular mixing chamber into a combustion zone in a combustion chamber;

D. supplying fuel to the combustion zone through the fuel conduit;

E. igniting the fuel and combustion-supporting gas in said combustion zone to form a hot combustion gas that suspends the particulate batch materials in the combustion chamber and heats the particulate batch materials to their melting temperature in the combustion chamber;

F. accelerating the heated particulate batch materials and hot combustion gas vertically downwardly through a restricted orifice into a reservoir chamber and into contact with the surface of a molten pool of said batch materials in the reservoir chamber, said accelerating step being performed with sufficient force to integrate and dissolve the particulate batch materials into the molten pool while repelling and separating the combustion gas to produce circulation of the molten pool.

12. The process of claim 11 wherein (i) the combustion-supporting gas consists of oxygen gas, and (ii) prior to igniting step E, the fuel and oxygen gas form a fuel/oxygen gas mixture of predetermined stoichiometry in the combustion zone.

13. The process of claim 12 wherein the particulate batch materials comprise glass forming particles.

14. The process of claim 11 wherein the particulate batch materials comprise glass forming particles.

* * * * *